(12) United States Patent
Shibayama et al.

(10) Patent No.: US 10,908,639 B2
(45) Date of Patent: Feb. 2, 2021

(54) PORTABLE INFORMATION DEVICE

(71) Applicant: LENOVO (SINGAPORE) PTE. LTD., Singapore (SG)

(72) Inventors: Yoshiyuki Shibayama, Yokohama (JP); Fumitake Mizoguchi, Yokohama (JP); Kazuya Tatsuno, Yokohama (JP); Takehito Yamauchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/746,382

(22) Filed: Jan. 17, 2020

(65) Prior Publication Data
US 2020/0249717 A1   Aug. 6, 2020

(30) Foreign Application Priority Data
Feb. 1, 2019   (JP) .................. 2019-016768

(51) Int. Cl.
*G06F 1/16*   (2006.01)
(52) U.S. Cl.
CPC .......... *G06F 1/1616* (2013.01); *G06F 1/1626* (2013.01); *G06F 1/1641* (2013.01); *G06F 1/1652* (2013.01); *G06F 1/1681* (2013.01)
(58) Field of Classification Search
CPC ..... G06F 1/1616; G06F 1/1633; G06F 1/1652

USPC .......... 361/679.02, 679.26, 679.27, 679.55, 361/679.56
See application file for complete search history.

(56) References Cited

U.S. PATENT DOCUMENTS

| | | | |
|---|---|---|---|
| 2017/0194580 A1 | 7/2017 | Lee | |
| 2017/0365197 A1* | 12/2017 | Kim | ............... G06F 1/1652 |
| 2019/0033925 A1* | 1/2019 | Hong | ............... G06F 1/1681 |
| 2020/0257335 A1* | 8/2020 | Kim | ............... G06F 1/1641 |

FOREIGN PATENT DOCUMENTS

| | | |
|---|---|---|
| JP | 2006175406 A | 7/2006 |
| JP | 2018112835 A | 7/2018 |
| JP | 2018113050 A | 7/2018 |

* cited by examiner

*Primary Examiner* — Anthony Q Edwards
(74) *Attorney, Agent, or Firm* — Shimokaji IP

(57) ABSTRACT

A portable information device includes a first chassis member, a second chassis member, a hinge mechanism, a display and a bezel member provided to bridge an outer peripheral edge portion of the display and an outer peripheral edge portion of the first and second chassis members. The bezel member is arranged farther away from the inner surfaces of the first and second chassis members than a rotation center of the hinge mechanism. The bezel member has a buffer portion at least at a position overlapping a bent portion of the display. The buffer portion can absorb compressive force F applied thereto as the first and the second chassis members are folded from a flat opened state.

6 Claims, 13 Drawing Sheets

PORTABLE INFORMATION DEVICE

FIELD OF THE INVENTION

The present invention relates to a foldable portable information device.

BACKGROUND OF THE INVENTION

Portable information devices such as a tablet PC and a smartphone have been rapidly spreading in recent years. Such a portable information device has a touch panel type liquid crystal display and does not have a physical keyboard. It is desirable for this kind of portable information device to have a display that is large in use but can be miniaturized to carry. Considering this, the applicant has proposed a portable information device in which use of a flexible display, such as an organic electro luminescence (EL) display, allows not only a chassis but also a display to be foldable (for example, see Japanese Unexamined Patent Application Publication No. 2018-112835).

SUMMARY OF THE INVENTION

In the device disclosed in Japanese Unexamined Patent Application Publication No. 2018-112835, a bezel member is mounted on an outer peripheral edge portion of a front side of the display to support the outer peripheral edge portion of the display and improve an appearance quality at the same time. A rotation center of a hinge mechanism for folding the chassis coincide with the front side of the display, which makes a smooth bending operation of the display possible. That is, in a folded state, the bezel member is positioned at an inner side than the rotation center of the hinge mechanism. The bezel member is thus subjected to compressive force generated by a phenomenon of so-called inner wheel difference as the chassis is folded. Repetitive application of this compressive force causes the bezel member to loosen and wrinkle, possibly deteriorating the appearance quality of the device.

The present invention has been made in view of the above-described problem with the conventional techniques, and an object thereof is to provide a portable information device capable of suppressing the deterioration of the appearance quality.

A portable information device according to a first aspect of the present invention is a foldable portable information device including: a first chassis member; a second chassis member, an edge portion of which being adjacent to an edge portion of the first chassis member; a hinge mechanism rotatably coupling the edge portion of the first chassis member and the edge portion of the second chassis member; a display provided across an inner surface of the first chassis member and an inner surface of the second chassis member, the display being foldable so that a portion of a display surface overlapping the first chassis member and a portion of the display surface overlapping the second chassis member face each other; and a bezel member provided to bridge an outer peripheral edge portion of the display and an outer peripheral edge portion of the first chassis member and the second chassis member except at the edge portions, the bezel member being arranged farther away from the inner surface of the first chassis member and the inner surface of the second chassis member than a rotation center of the hinge mechanism, wherein the bezel member has a buffer portion at least at a position overlapping a bent portion of the display, the buffer portion being able to absorb compressive force applied thereto as the first chassis member and the second chassis member are folded from a flat opened state.

A portable information device according to a second aspect of the present invention is a foldable portable information device including: a first chassis member; a second chassis member, an edge portion of which being adjacent to an edge portion of the first chassis member; a hinge mechanism rotatably coupling the edge portion of the first chassis member and the edge portion of the second chassis member; a display provided across an inner surface of the first chassis member and an inner surface of the second chassis member, the display being foldable so that a portion of a display surface overlapping the first chassis member and a portion of the display surface overlapping the second chassis member face each other; and a bezel member provided to bridge an outer peripheral edge portion of the display and an outer peripheral edge portion of the first chassis member and the second chassis member except at the edge portions, the bezel member being arranged farther away from the inner surface of the first chassis member and the inner surface of the second chassis member than a rotation center of the hinge mechanism, wherein the bezel member has a buffer portion at a position overlapping a bent portion of the display, the buffer portion being formed to be more flexible than other portions of the bezel member.

According to these configurations, the bezel member is folded inside the chassis members, with the bezel member arranged farther away from the inner surfaces of the first chassis member and the second chassis member than the rotation center of the hinge mechanism. When the bezel member is subjected to compressive force generated by a phenomenon of so-called inner wheel difference as the chassis members are folded, the buffer portion can absorb the compressive force. This allows the portable information device to prevent the bezel member from loosening, wrinkling, lifting and so on despite the repetitive application of the compressive force to the bezel member, thereby suppressing the deterioration of the appearance quality.

The buffer portion may be constituted by a plurality of hole portions that are open to a top surface of the bezel member. This allows the buffer portion to be formed with a simple configuration. Moreover, the hole portions can effectively absorb the compressive force.

The bezel member includes a base material and a sheet member provided between a back side of the base material and a front side of the display, wherein the hole portions may be formed to penetrate the base material in a thickness direction, and bottoms of the hole portions may be closed with the sheet member. The buffer portion can then be formed by merely punching the base material. Furthermore, the sheet member can prevent members and parts provided in the chassis members from being exposed to an outer appearance through the hole portions.

A part of the plurality of hole portions may be open to a side end surface of the bezel member. As a result, no continuous portion extending along the direction of the compressive force is formed in the buffer portion. This can prevent looseness, wrinkle and so on to be induced due to insufficient absorption of the compressive force by such continuous portion.

An entire length of the bezel member may be fixed to the front side of the display. This allows the bezel member to be completely fixed to the front side of the display, which results not only in a high appearance quality but also in suppression of looseness, wrinkle and so on induced by the buffer portion over time.

Thus, the above-described aspects of the invention can suppress deterioration of the appearance quality caused by wrinkling and loosening of the bezel member.

DETAILED DESCRIPTION OF THE INVENTION

In the following, a preferred embodiment of a portable information device according to the present invention will be described in detail with reference to accompanying drawings.

1. Description of Overall Structure of Portable Information Device

Figure 1:
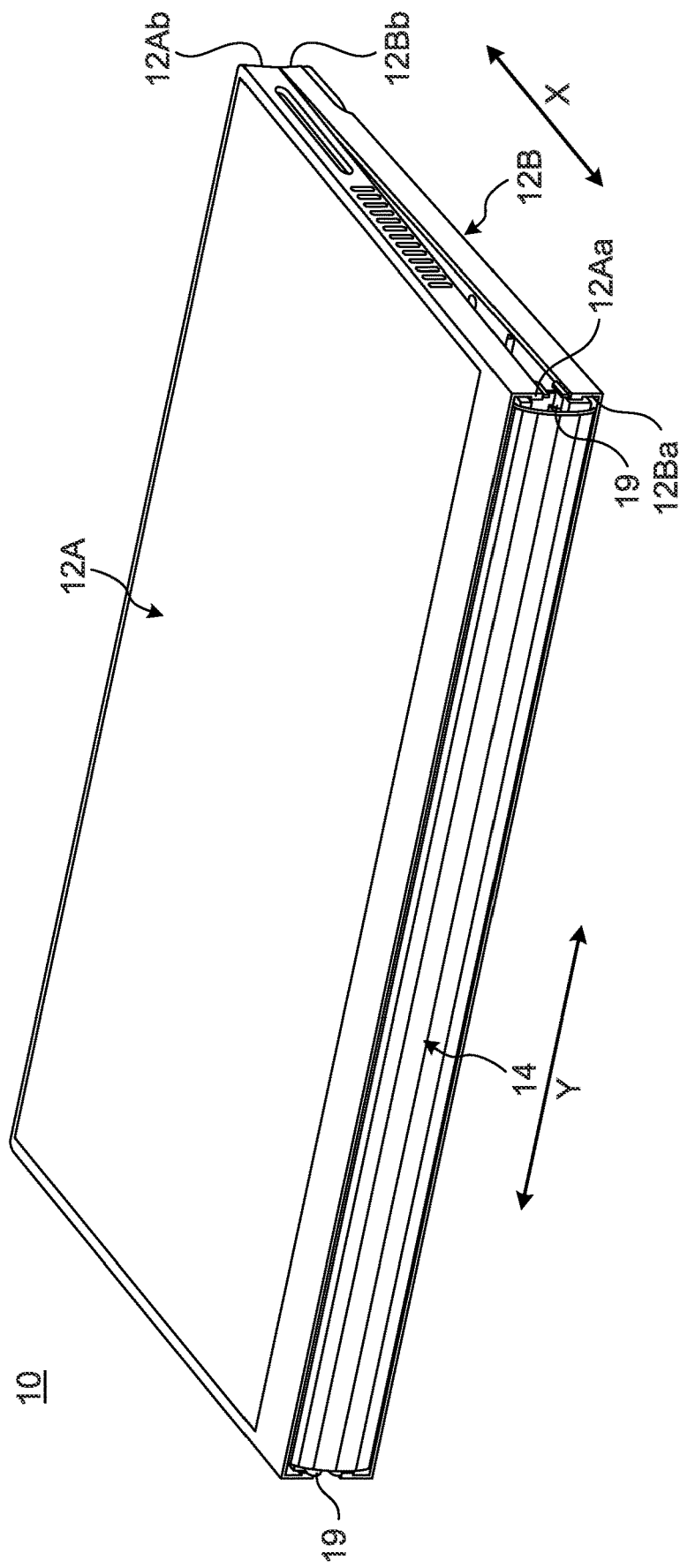
FIG. 1 is a perspective view illustrating a portable information device according to an embodiment that has been closed into a storage form.
Figure 2:
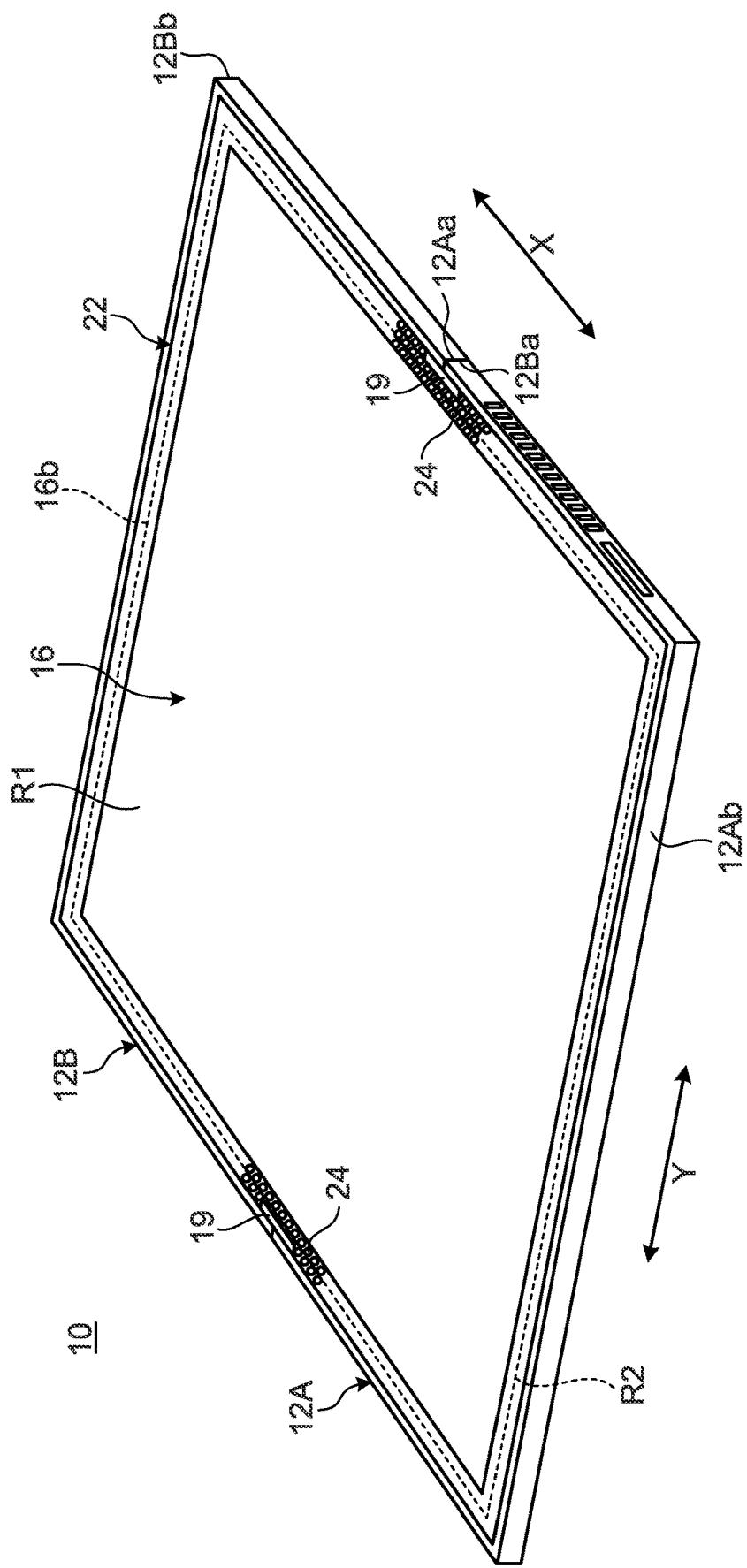
FIG. 2 is a perspective view schematically illustrating the portable information device shown in FIG. 1 that has been opened into a usage form.
Figure 3:
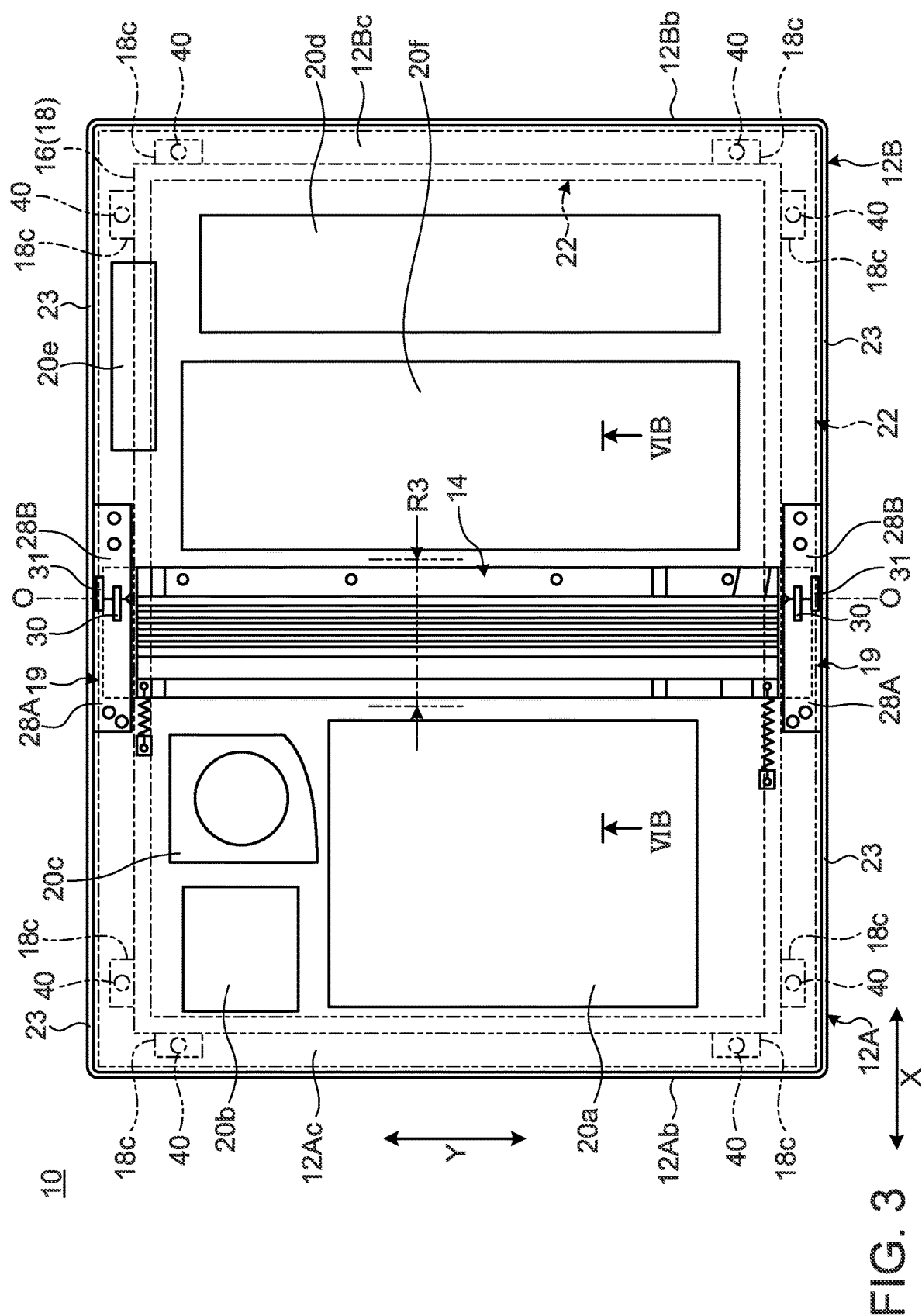
FIG. 3 is a plan view schematically illustrating an internal structure of the portable information device shown in FIG. 2.
Figure 4:
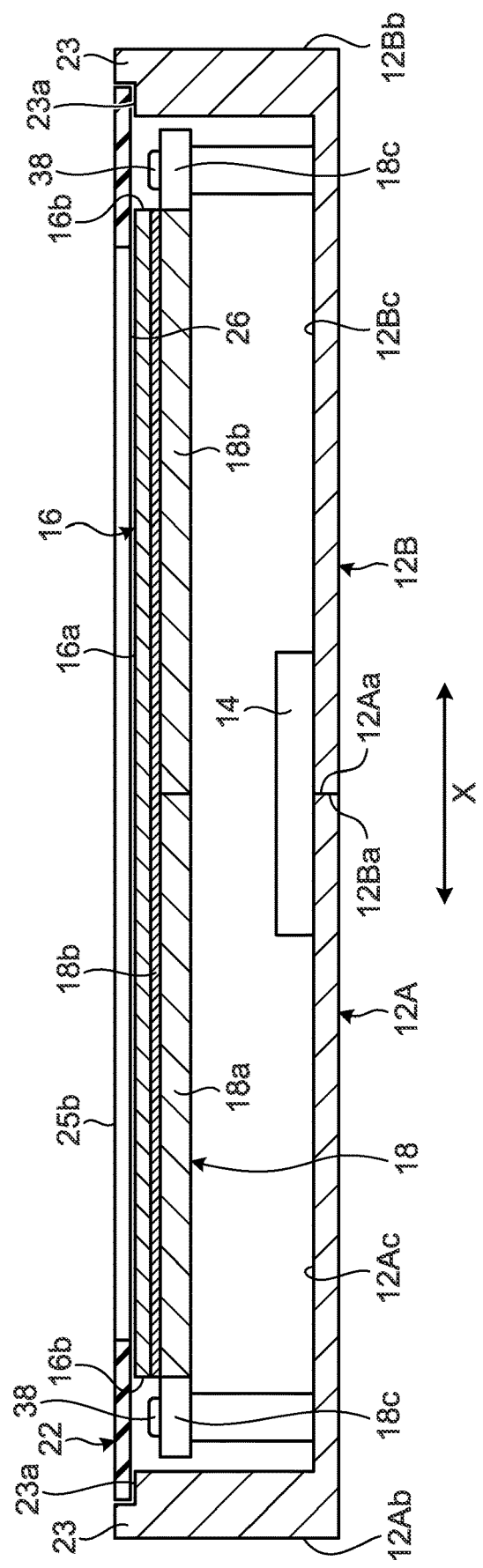
FIG. 4 is a cross-sectional view schematically illustrating a cross-sectional structure of the portable information device shown in FIG. 2.

FIG. 1 is a perspective view illustrating a portable information device 10 according to an embodiment that has been closed into a storage form. FIG. 2 is a perspective view schematically illustrating the portable information device 10 shown in FIG. 1 that has been opened into a usage form. FIG. 3 is a plan view schematically illustrating an internal structure of the portable information device 10 shown in FIG. 2. FIG. 4 is a cross-sectional view schematically illustrating a cross-sectional structure of the portable information device 10 shown in FIG. 2.

As illustrated in FIGS. 1 and 2, the portable information device 10 includes a first chassis member 12A, a second chassis member 12B, a spine member 14 and a display 16. In the present embodiment, a tablet PC that is foldable into a double-folded state like a folio is exemplary shown as the portable information device 10. The portable information device 10 may alternatively be a mobile phone, a smartphone, an electronic notebook or the like.

Each of the chassis members 12A and 12B is a rectangular plate member having a side wall that is erected from three sides thereof except for a side corresponding to the spine member 14. Each of the chassis members 12A and 12B is configured by a metal plate of stainless steel, magnesium, aluminum or the like or a fiber-reinforced resin plate containing reinforced fibers such as carbon fibers. A display 16 is fixed to the inner surfaces of the chassis members 12A and 12B via a support plate 18 (see also FIG. 4). The chassis members 12A and 12B are coupled to each other by a pair of hinge mechanisms 19 and 19. The hinge mechanisms 19 couple the chassis members 12A and 12B so that the chassis members can be folded into the storage form shown in FIG. 1 as well as opened to the usage form shown in FIG. 2. A dashed and dotted line O in FIG. 3 represents a bending center O serving as a center of a folding operation of the chassis members 12A and 12B.

In the chassis members 12A and 12B, inner end surfaces 12Aa and 12Ba on the side of the spine member 14 are located on the hinge side, and outer end surfaces 12Ab and 12Bb on the sides opposite to the spine member 14 are located on open end portion sides. In the following description of the portable information device 10, as illustrated in FIGS. 1 to 3, directions from the spine member 14 to the outer end surfaces 12Ab and 12Bb are referred to as X direction and directions along the longitudinal direction of the spine member 14 are referred to as Y direction.

As illustrated in FIG. 3, a main substrate 20a, a communication module 20b, a cooling fan 20c and others are attached to be fixed to the inner surface 12Ac of the first chassis member 12A using a screw or the like which is not shown. A sub-substrate 20d, an antenna 20e, a battery unit 20f and others are attached to be fixed to the inner surface 12Bc of the second chassis member 12B using a screw or the like which is not shown.

The display 16 is a touch panel type liquid crystal display, for example. The display 16 is structured to be foldable along with the chassis members 12A and 12B when the chassis members 12A and 12B are folded. The display 16 is a flexible display such as an organic EL having a paper structure with high flexibility, for example, and is opened/closed along with an opening/closing operation of the chassis members 12A and 12B.

The display 16 is attached to be fixed to the inner surfaces 12Ac and 12Bc of the chassis members 12A and 12B via the support plate 18 using a screw which is not shown. As illustrated in FIG. 4, a back side of a display surface (front side 16a) of the display 16 is adhered to be fixed to a front side of the support plate 18 using an adhesive, a double-sided tape or the like. In the present embodiment, the support plate 18 includes a pair of plate members 18a and 18a which are coupled to each other so as to be bendable about the bending center O. The pair of plate members 18a and 18a has a flexible sheet 18b stuck onto the entire front sides thereof. The flexible sheet 18b is made of a metallic foil or the like and couples the plate members 18a and 18a to each other in a bendable manner.

In the usage form shown in FIG. 2, the display 16 is formed as one plate so that a part of the front side 16a overlapping the chassis member 12A and a part of the front side 16b overlapping the chassis member 12B are placed side by side. In the storage form shown in FIG. 1, the display 16 has been bent into the double-folded state via the bent portion 16c so that the parts of the front side 16a overlapping the chassis members 12A and 12b face each other (see FIG. 8C).

Figure 5:
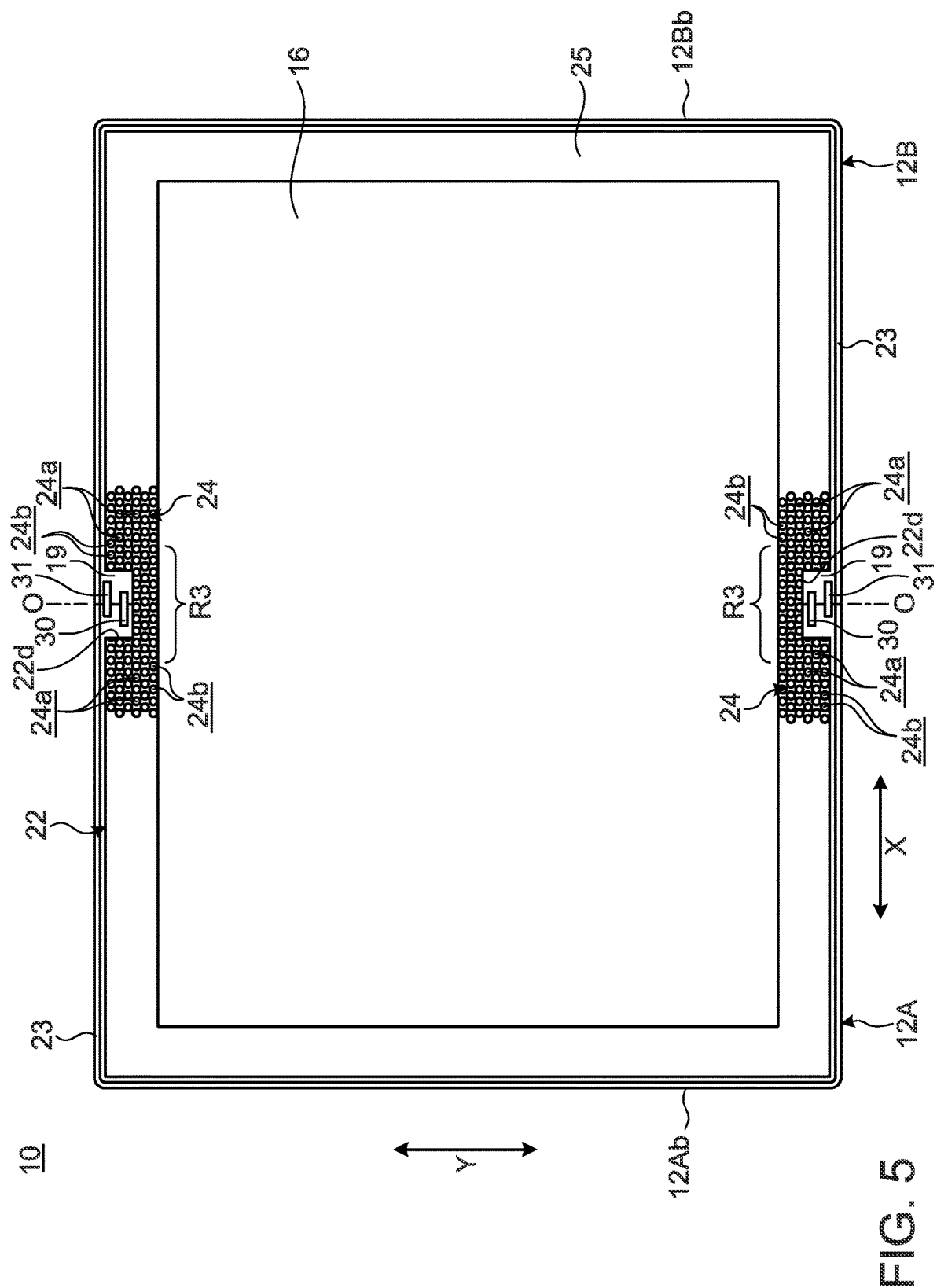
FIG. 5 is a plan view of the portable information device shown in FIG. 2.

As illustrated in FIG. 2, a bezel member 22 is disposed on an outer peripheral edge portion 16b of the front side 16a of the display 16 that has been attached to be fixed to the inner surface of the chassis members 12A and 12B (see also FIG. 5). The bezel member 22 is provided to cover a non-displaying region (inactive region) R2 which is a region excluding a display region (active region) R1 and arranged in the outer peripheral edge portion 16b of the front side of the display 16.

2. Description of Bezel Member

Figure 6A:
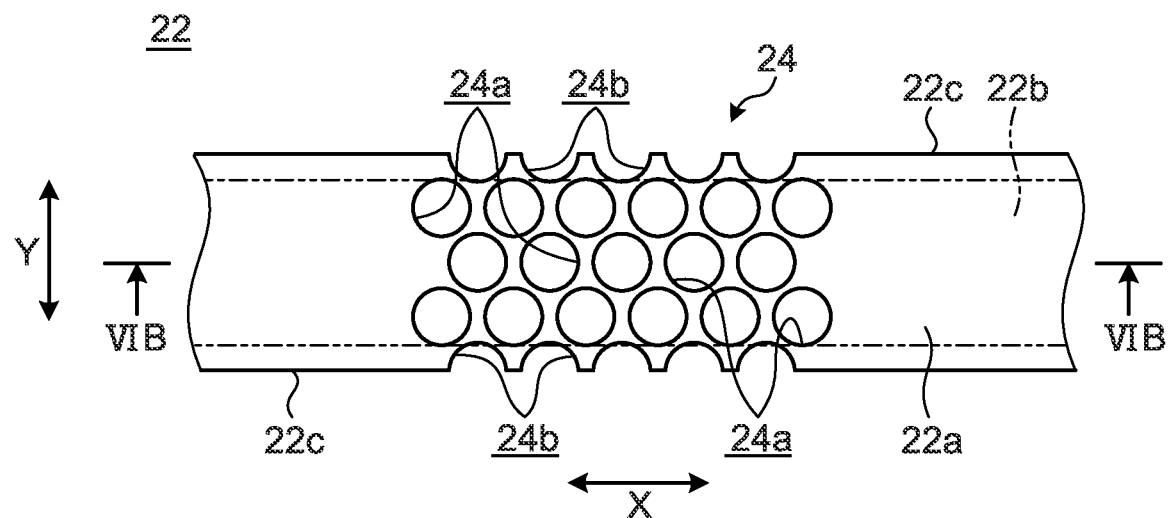
FIG. 6A is a plan view schematically illustrating a principle part of a bezel member of the portable information device shown in FIG. 5.
Figure 6B:
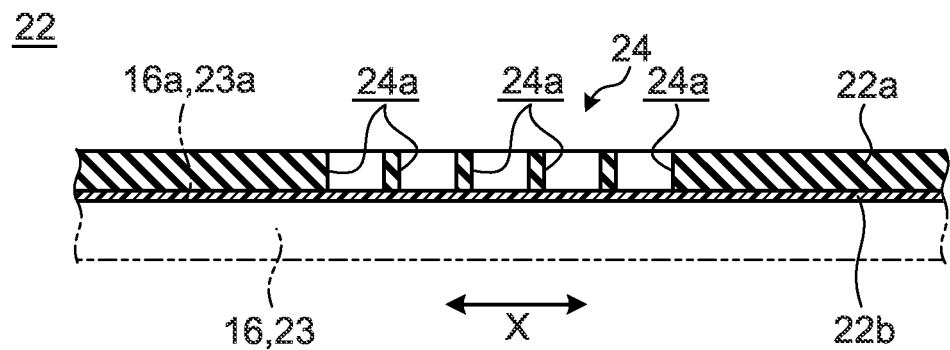
FIG. 6B is a cross-sectional view along the line VIB-VIB in FIG. 6A.

Description is made of a specific configuration example of the bezel member 22. FIG. 5 is a plan view of the portable information device 10 shown in FIG. 2. FIG. 6A is a plan view schematically illustrating a principle part of a bezel member 22 of the portable information device 10 shown in FIG. 5. FIG. 6B is a cross-sectional view along the line VIB-VIB in FIG. 6A.

As illustrated in FIG. 4, a bezel member 22 is provided to bridge the outer peripheral edge portions 16b of the front side 16a of the display 16 and top surfaces 23a of peripheral wall portions 23 of the chassis members 12A and 12B that have been opened flat. The bezel member 22 supports the outer peripheral edge portion 16b of the display 16 and conceals a gap and a level difference generated between the outer peripheral edge portion 16b of the display 16 and the peripheral wall portions 23 of the chassis members 12A and 12B.

As illustrated in FIG. 5, the bezel member 22 is disposed along the entire length of the outer peripheral edge portion 16b of the display 16 and thus is formed as a rectangular frame in plan view. In other words, the bezel member 22 extends along three sides of the first chassis member 12A except for the side along the inner end surface 12Aa and three sides of the second chassis member 12B except for the side along the inner end surface 12Ba. The back side of the bezel member 22 is fixed to the front side 16a and the top surfaces 23a through the full length thereof using a double-sided tape or an adhesive.

As illustrated in FIGS. 5, 6A and 6B, the bezel member 22 includes a base material 22a and a cover sheet 22b. A buffer portion 24 is provided in a part of the bezel member 22.

The base material 22a is formed of an elastic material such as silicone rubber or the like and shaped into a frame. The base material 22a may be formed of a soft resin material. The cover sheet 22b is a flexible sheet member that is formed of a resin material such as polycarbonate, for example, and is thinner than the base material 22a. The cover sheet 22b has an outer dimension that is equal to or smaller than that of the base material 22a. The front side of the cover sheet 22b is fixed to the back side of the base material 22a using a double-sided tape or an adhesive, while the back side of the cover sheet 22b is fixed to the front side 16a of the display 16 and the top surface 23a of the peripheral wall portion 23 of the chassis members 12A and 12B using a double-sided tape or an adhesive. The cover sheet 22b may be provided only in a part corresponding to the buffer portion 24.

The buffer portion 24 is a portion that absorbs the compressive force applied to the bezel member 22 as the chassis members 12A and 12B are folded from the usage form into the storage form. The buffer portion 24 is provided in a part that corresponds to a bent region R3 of the portable information device 10. The bent region R3 overlaps the bent portion 16c of the display 16 (see FIG. 8C) and the hinge mechanism 19 and is bent as the chassis members 12A and 12B are opened/closed. The buffer portion 24 may be provided along the full length of the bezel member 22 or may be provided at a position overlapping the bent portion 16c only partially.

As illustrated in FIGS. 6A and 6B, the buffer portion 24 is constituted by a plurality of hole portions 24a and 24b penetrating the base material 22a in a thickness direction. For example, the hole portions 24a and 24b are formed by punching the base material 22a. The hole portions 24a may be circular holes. The hole portions 24b are arranged at positions overlapping the side end surfaces 22c of the base material 22a. Each of the hole portions 24b thus has a shape of the hole portion 24a partially notched, i.e., a semi-circular shape, for example. As such, inner surfaces of the hole portions 24b are open to the side end surfaces 22c.

Bottoms of the hole portions 24a are closed by the cover sheet 22b. This prevents members and parts provided in the chassis members 12A and 12B from being visually recognized from the appearance of the portable information device 10 through the hole portions 24a. Although FIG. 6A exemplarily illustrates that only the hole portions 24a are covered by the cover sheet 22b (see the cover sheet 22b indicated by a dashed and double dotted line in FIG. 6A), the cover sheet 22b may cover a part or all of the hole portions 24b.

In the present embodiment, the bezel member 22 has cutout portions 22d at positions corresponding to the bent regions R3 in order to avoid the hinge mechanisms 19 that project upward (see FIG. 5). The cutout portions 22b may be omitted depending on specifications of the hinge mechanisms 19.

Figure 7:
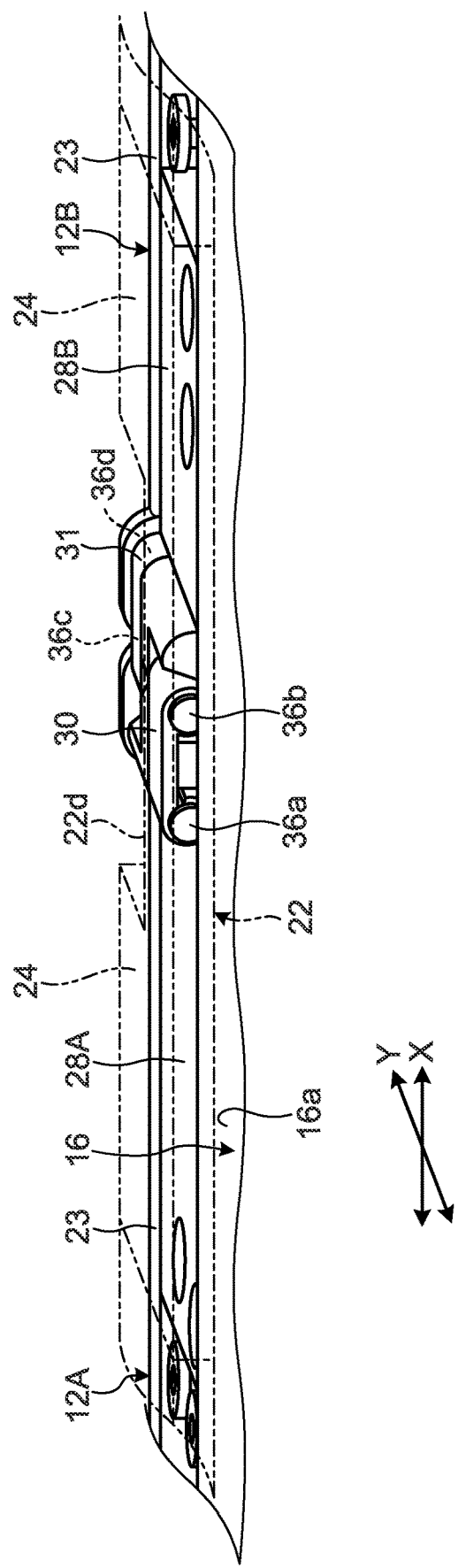
FIG. 7 is an enlarged perspective view illustrating a positional relationship of principle parts of a display, the bezel member and a hinge mechanism.
Figure 8A:
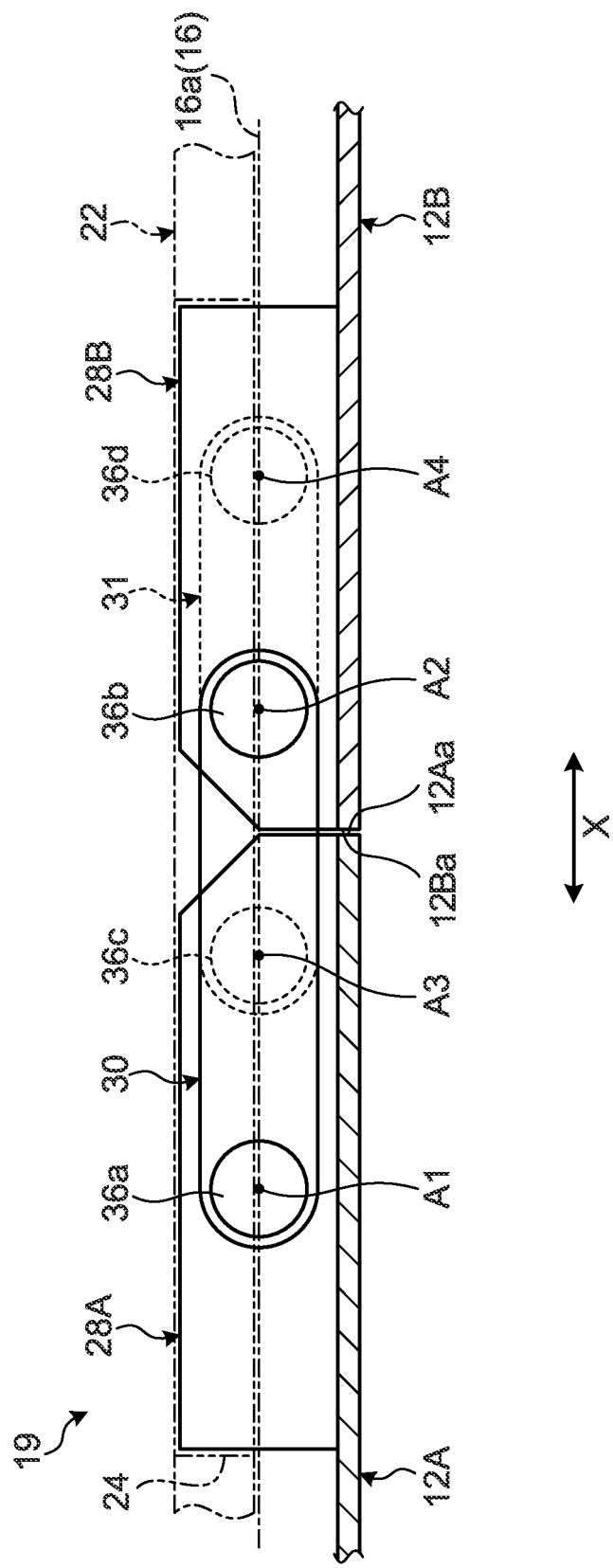
FIG. 8A is a side view schematically illustrating the positional relationship of the display, the bezel member and the hinge mechanism when chassis members are in an opened state.
Figure 8B:
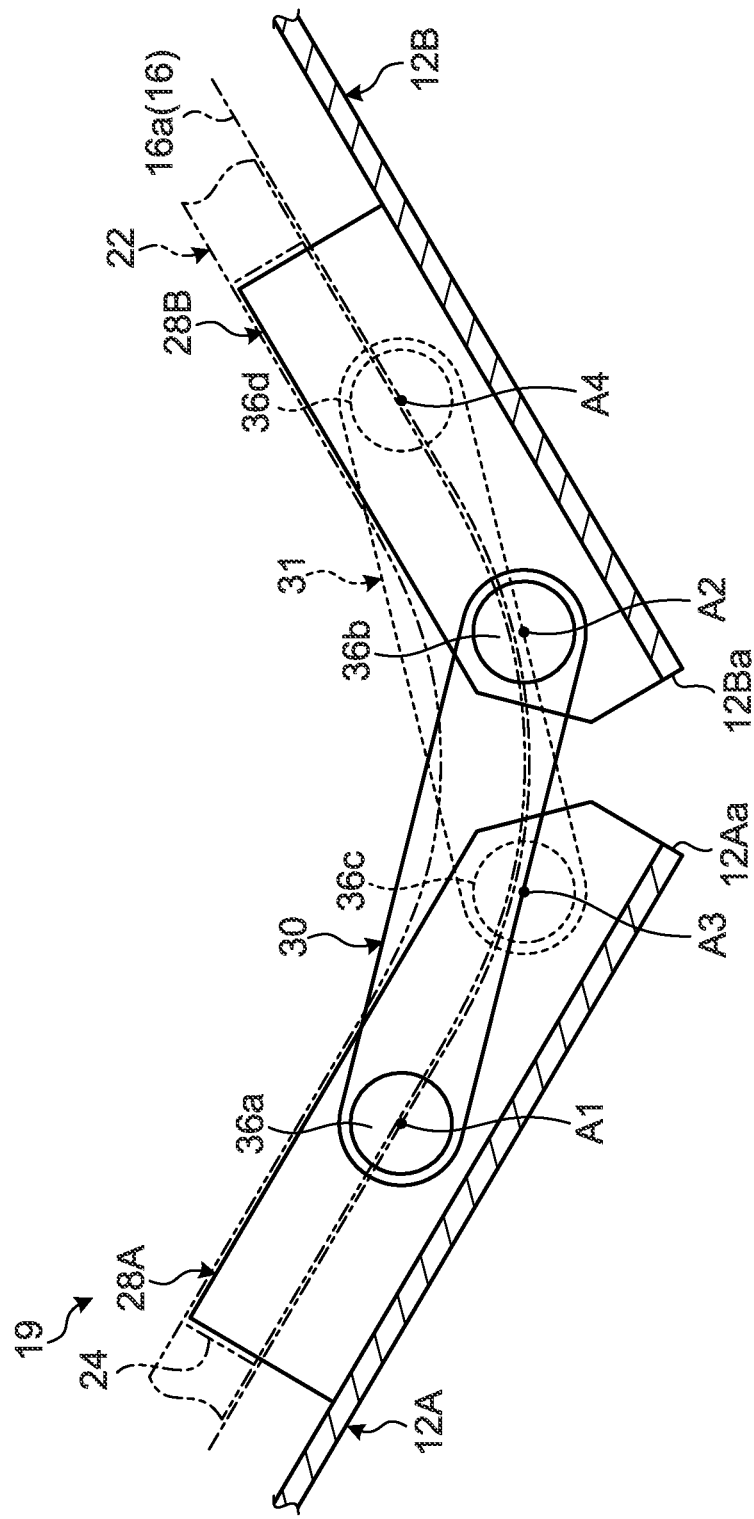
FIG. 8B is a side view illustrating chassis members during a closing operation from the state shown in FIG. 8A.
Figure 8C:
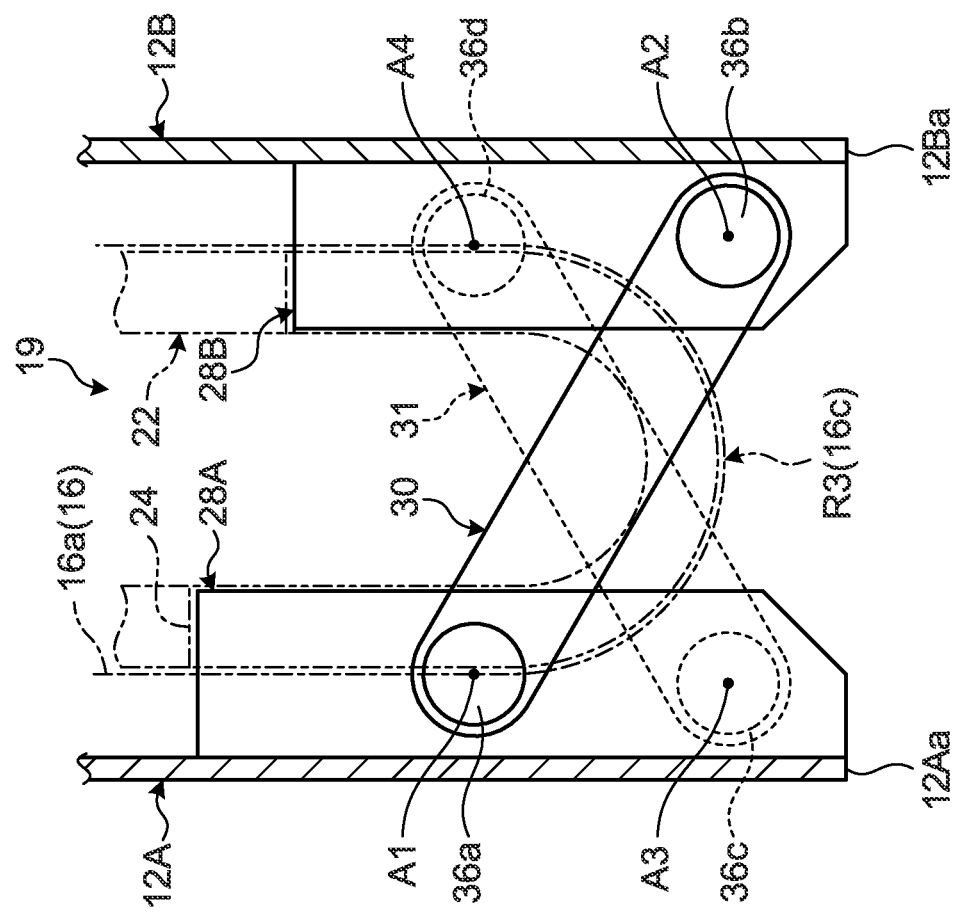
FIG. 8C is a side view illustrating the chassis members that have been further closed from the state shown in FIG. 8B into a folded state.

3. Relationship Between Bezel Member and Opening/Closing Operation of Chassis Members Description is now made of a relationship between the bezel member 22 and an opening/closing operation of the chassis members 12A and 12B. FIG. 7 is an enlarged perspective view illustrating a positional relationship of principle parts of the display 16, the bezel member 22 and the hinge mechanism 19. FIG. 8A is a side view schematically illustrating the positional relationship of the display 16, the bezel member 22 and the hinge mechanism 19 when the chassis members 12A and 12B are in an opened state. FIG. 8B is a side view illustrating the chassis members 12A and 12B during the closing operation from the state shown in FIG. 8A. FIG. 8C is a side view illustrating the chassis members 12A and 12B that have been further closed from the state shown in FIG. 8B into a folded state.

3.1 Description of Hinge Mechanism

First, a configuration example of the hinge mechanism 19 is described. As illustrated in FIGS. 3 and 7, the hinge mechanisms 19 are disposed one at each position overlapping an end portion in the longitudinal direction of the spine member 14. The hinge mechanisms 19 are arranged outside the outer peripheral edge portion 16b of the display 16 and configured to be symmetric to each other. Each of the hinge mechanisms 19 has a first hinge chassis 28A, a second hinge chassis 28B, a first arm 30 and a second arm 31.

Each of the hinge chassis 28A and 28B is a component of a thin block shape formed of resin, metal or the like. The first hinge chassis 28A is screwed to be fixed to the first chassis member 12A and the second hinge chassis 28B is screwed to be fixed to the second chassis member 12B.

One end of the first arm 30 is rotatably coupled to the first hinge chassis 28A via a first hinge shaft 36a, while the other end of the first arm 30 is rotatably coupled to the second hinge chassis 28B via a second hinge shaft 36b (see also FIGS. 8A to 8C). One end of the second arm 31 is rotatably coupled to the second hinge chassis 28B via a third hinge shaft 36c, while the other end of the second arm 31 is rotatably coupled to the first hinge chassis 28A via a fourth hinge shaft 36d. The first arm 30 and the second arm 31 are arranged side by side in Y direction. The second hinge shaft 36b of the first arm 30 is located at a position between the third hinge shaft 36c and the fourth hinge shaft 36d of the second arm 31. The third hinge shaft 36c of the second arm 31 is located at a position between the first hinge shaft 36a and the second hinge shaft 36b of the first arm 30. As such, the first arm 30 and the second arm 31 are alternately arranged with deviations in X and Y directions.

Each hinge mechanism 19 works in such a manner that, as the chassis members 12A and 12B are folded about the bending center O, the arm members 30 and 31 rotate via the hinge shafts 36a to 36d (see FIGS. 8A to 8C). In this way, the hinge mechanisms 19 couple the chassis members 12A and 12B so as to be rotatable between the folded state and a flat opened state.

3.2 Description of Positional Relationship of Display, Bezel Member and Hinge Mechanisms Description is now made of a positional relationship of the display 16, the bezel member 22 and the hinge mechanisms 19.

As illustrated in FIG. 4, the display 16 is attached to the chassis members 12A and 12B via the support plate 18. As illustrated in FIG. 3, the hinge mechanisms 19 are respectively disposed at end portions in the longitudinal direction (Y direction) of an edge portion (inner end surface 12Aa and 12Ba) of the chassis members 12A and 12B, and are thus arranged outside the outer peripheral edge portion 16b of the display 16.

The attachment structure of the display 16 is not limited. For example, the display 16 is attached to the chassis members 12A and 12B via attachment pieces 18c of the support plate 18 as can be seen in FIG. 3. The attachment pieces 18c are provided at appropriate positions of an outer peripheral edge portion of the support plate 18 and project outward from the outer peripheral edge portion of the plate members 18a. The attachment pieces 18c are respectively provided with screwing through-holes in the centers thereof. The support plate 18 (display 16) is fastened to be fixed to the chassis members 12A and 12B by fastening fixing screws 38 to the chassis members 12A and 12B through these through-holes. Instead of the attachment pieces 18c, boss-type female screw portions or the like may be provided on a bottom surface of the plate member 18a.

The display 16 of the present embodiment is folded into a double-folded state. For this reason, the bent region R3 (see FIG. 3) of the display 16, which corresponds to the spine member 14, is not fixed to the chassis members 12A and 12B, while other parts of the display 16 are positioned and fixed. Thus, when the display 16 is folded into the double-folded state to form the bent portion 16c, the display 16 has been positioned on and fixed to the chassis members 12A and 12B. As such, depending on a positional relationship of the display 16, the hinge mechanisms 19 and the hinge shafts 36a to 36d, a load applied to the bent region R3 of the display 16 during an opening/closing operation is increased, which may lead to failure in smoothly bending the display 16.

Considering this, the portable information device 10 is configured such that the front side 16a of the display 16 and the axial centers A1 to A4 of the hinge shafts 36a to 36d are disposed on a same plane when the first chassis member 12A and the second chassis member 12B are opened into a flat usage form as illustrated in FIGS. 7 and 8A. In other words, the axial centers A1 to A4 are disposed on a virtual plane that is flush with the front side 16a of the display 16 in the flat opened state. Accordingly, when the chassis members 12A and 12B are folded from the usage form shown in FIG. 8A, the arms 30 and 31 rotate around the hinge shafts 36a to 36d as illustrated in FIG. 8B, which causes the chassis members 12A and 12B to be gradually folded and the display 16 to be bent as well. In the end, the chassis members 12A and 12B are folded into the double-folded state. The display 16 is also folded into a double-folded state and draws an arc of a predetermined curvature on design as illustrated in FIG. 8C.

Figure 9A:
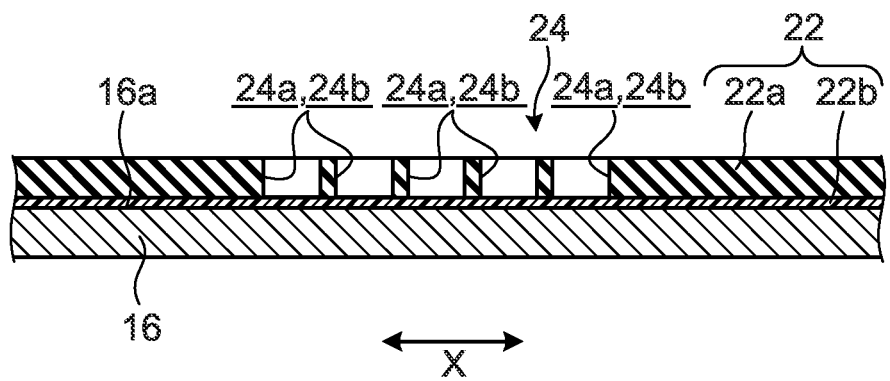
FIG. 9A is a side cross-sectional view schematically illustrating the bezel member and the display in a usage form shown in FIG. 8A.
Figure 9B:
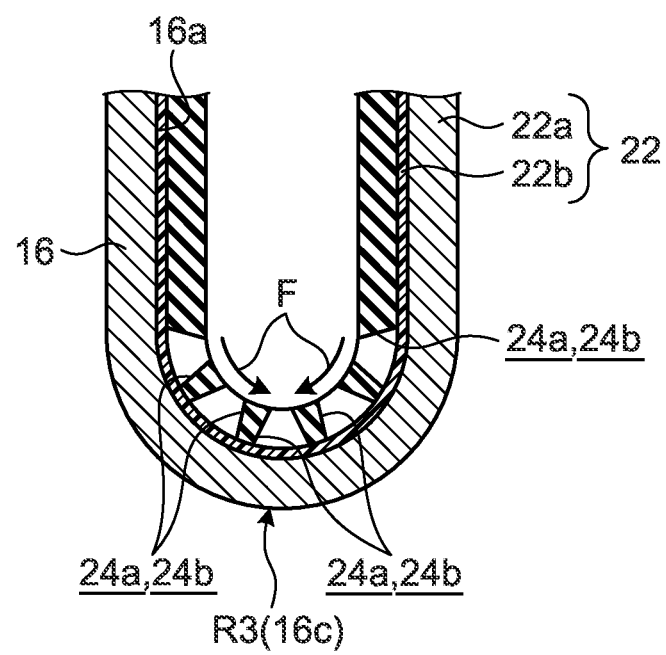
FIG. 9B is a side cross-sectional view illustrating the chassis members having been folded from the state shown in FIG. 9A.

FIGS. 9A and 9B are side cross-sectional views schematically illustrating the bezel member 22 and the display 16 as the chassis members 12A and 12B are folded from the usage form shown in FIG. 8A into the storage form shown in FIG. 8C.

As described above, the bezel member 22 is provided on the front side 16a of the display 16. Therefore, the bezel member 22 is arranged farther away (upper) from the inner surfaces 12Ac and 12Bc of the chassis members 12A and 12B than the rotation center of the hinge mechanism 19 (axial centers A1 to A4). The bezel member 22 is thus positioned at the inner side than the axial centers A1 to A4 of the hinge mechanism 19 (the front side 16a of the display 16) when the chassis members 12A and 12B are closed. As a result, when the chassis members 12A and 12B are closed, parts corresponding to the bent region R3 and the vicinity thereof in the bezel member 22 are subjected to compressive force F (see FIG. 9B) generated by a phenomenon of so-called inner wheel difference. This may cause the bezel member 22 to loosen and wrinkle, especially at the positions overlapping the bent region R3 (bent portions 16c of the display 16).

Suppose the bezel member 22 is not provided with the buffer portion 24. Such bezel member 22 cannot absorb or release the compressive force F except by crushing the solid bezel member 22 itself. Applying the compressive force F that exceeds a crush amount of such bezel member 22 may therefore cause it to peel off, loosen, wrinkle, lift and so on.

In this regard, the bezel member 22 of the present embodiment is provided with the buffer portions 24 at least at the positions overlapping the bent portions 16c of the display 16. This allows, when the bezel member 22 is subjected to the compressive force F during the folding of the chassis members 12A and 12B from the usage form shown in FIG. 9A into the storage form shown in FIG. 9A, the buffer portion 24 to be compressed first. Specifically, upon application of the compressive force F to the bezel member 22, inner spaces (hollow portions) of the hole portions 24a and 24b constituting the buffer portion 24 crush (see FIG. 9B). The portable information device 10 thus enables to eliminate peeling off, loosening, wrinkling, lifting and so on of the bezel member 22 despite repetitive application of the compressive force F thereto, which prevents the appearance quality from deteriorating.

Recall that, in the buffer portion 24 of the bezel member 22, the hole portions 24b at the side portions in the width direction are open to the side end surfaces 22c. That is, the buffer portion 24 forms no continuous portion along the direction of the compressive force (X direction) by surely arranging any of the hole portions 24a and 24b along the X direction. The buffer portion 24 thus prevents that such continuous portion causes the loosening, wrinkling and the like by failing to absorb the compressive force F sufficiently.

Figure 10:
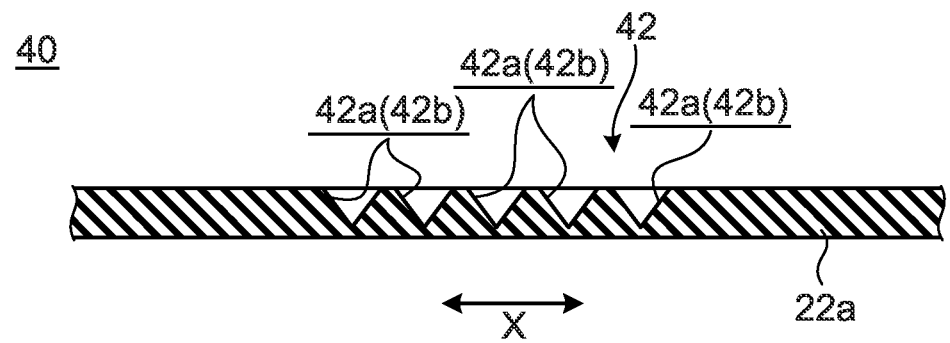
FIG. 10 is a side cross-sectional view of a bezel member according to a first modified example.

FIG. 10 is a side cross-sectional view of the bezel member 40 according to a first modified example.

The bezel member 40 shown in FIG. 10 is identically shaped as the bezel member 22 shown in FIG. 6A in plan view. On the other hand, the bezel member 40 is different from the bezel member 22 in that the buffer portion 42 is constituted by a plurality of hole portions 42a and 42b having different shapes from those of the hole portions 24a and 24b and that the bezel member 40 doesn't have the cover sheet 22b. The hole portions 42a and 42b are molded simultaneously with the base material 22a, for example. The hole portions 42a have a conical shape, for example. Although not illustrated, the hole portions 42b are formed at positions overlapping the side end surfaces 22c and thus have a shape of the hole portion 42a partially notched, i.e., a semi-circular shape, for example. Inner surfaces of the hole portions 42b are open to the side end surfaces 22c accordingly.

This enables the buffer portion 42 of the bezel member 40 also to absorb the compressive force F applied as the chassis members 12A and 12B are folded, thereby the bezel member 40 is prevented from loosening, wrinkling, lifting and so on. The bezel member 40 has fewer components than the bezel member 22 by not requiring the cover sheet 22b, which allows manufacturing cost to be reduced.

Figure 11:
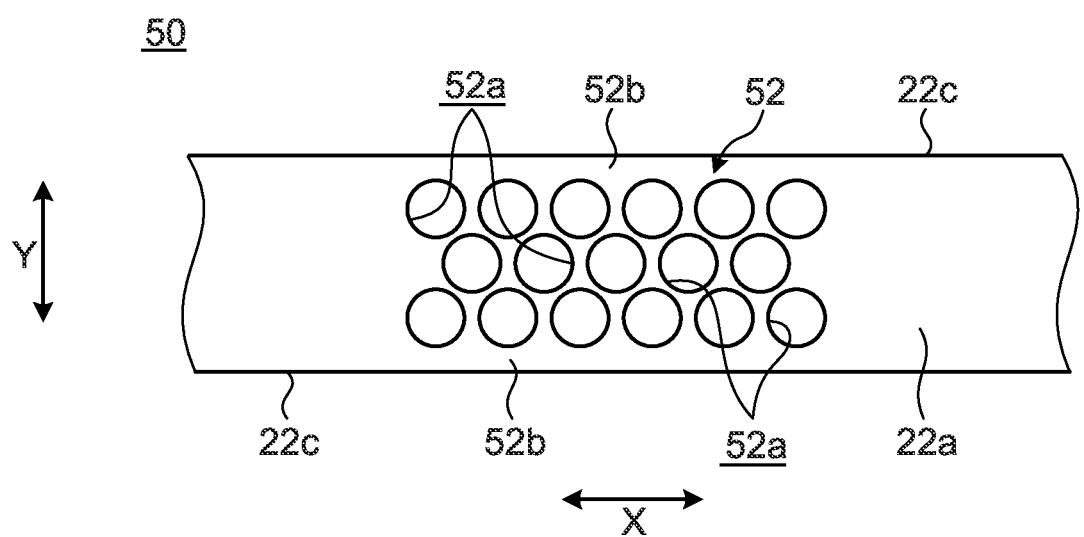
FIG. 11 is a side cross-sectional view of a bezel member according to a second modified example.

FIG. 11 is a side cross-sectional view of the bezel member 50 according to a second modified example.

The bezel member 50 shown in FIG. 11 eliminates the hole portions 24b (42b) of the above-described bezel member 22 (40). In other words, the bezel member 50 has a buffer portion 52 constituted by a plurality of hole portions 52a, and the hole portions 52a are not open to the side end surfaces 22c of the bezel member 50. The buffer portion 52 of the bezel member 50 thus includes portions that are formed to be continuous along the longitudinal direction (X direction). Nevertheless, the buffer portion 52 of the bezel member 50 can be used in a same manner as the bezel member 22 or the like as long as widths of the continuous portions 52b adjacent to the side end surfaces 22c are considerably narrow or the base material 22a forming the continuous portions 52 is considerably flexible so that the continuous portions 52b are prevented from causing the loosening, wrinkling and the like.

Figure 12A:
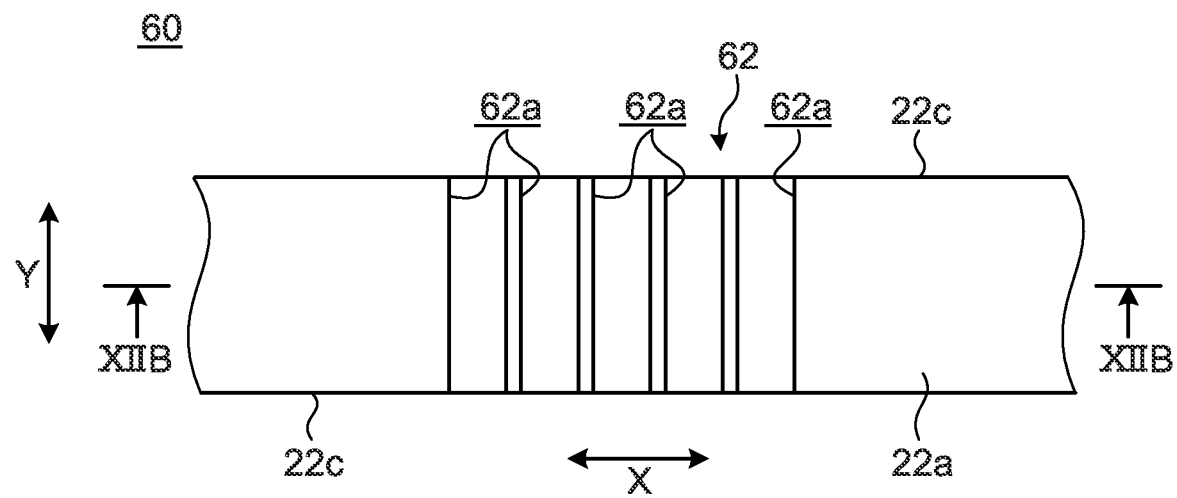
FIG. 12A is a plan view schematically illustrating a principle part of a bezel member according to a third modified example.
Figure 12B:
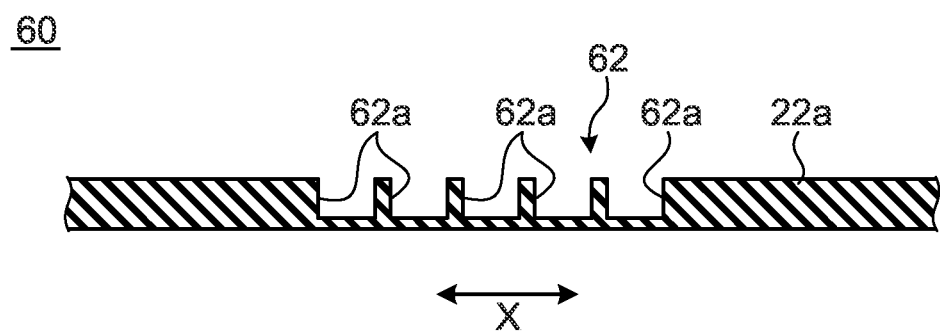
FIG. 12B is a cross-sectional view along the line XII-XII in FIG. 12A.

FIG. 12A is a plan view schematically illustrating a principle part of a bezel member 60 according to a third modified example. FIG. 12B is a cross-sectional view along the line XII-XII in FIG. 12A.

The bezel member 60 shown in FIGS. 12A and 12B is different from the bezel member 22 shown in FIGS. 6A and 6B in that a buffer portion 62 is constituted by a plurality of hole portions 62a having a different shape from that of the hole portions 24a and 24b and that the bezel member 60 doesn't have the cover sheet 22b. The hole portions 62a are grooves provided along a width direction (Y direction) of the bezel member 60 and are open to the side end surfaces 22c. The hole portions 62a are formed by cutting the base material 22a or molded simultaneously with the base material 22a, for example.

The buffer portion 62 of the bezel member 60 thus described also absorbs the compressive force F applied as the chassis members 12A and 12B are folded. This prevents the bezel member 60 from loosening, wrinkling, lifting and the like. The bezel member 60 has fewer components than the bezel member 22 by not requiring the cover sheet 22b, which allows manufacturing cost to be reduced.

As described above, the buffer portion 24 or the like is constituted by the hole portions 24a or the like provided by molding the base material 22a. This offers greater flexibility in the buffer portion than in other portions of the base material 22a that absorbs external force. Instead of thus profiling the base material 22a to form the buffer portion 24 or the like, the buffer portion may be created by employing a more flexible material for the portion overlapping the bent portion 16c than for the other portions of the bezel member.

It is a matter of course that the present invention is not limited to the embodiment described above and can be freely altered without deviating from the scope of the present invention.

Description has been made in the above of the portable information device 10 that is foldable into a double-folded state like a folio. Note that the portable information device of the present invention may be configured not only with two chassis members of the same shape coupled to each other in a foldable manner, but also with: a larger chassis member and two smaller chassis members foldably coupled to the left and right edge portions of the larger chassis member like double doors; one chassis member to each of left and right sides thereof a chassis member is coupled, wherein the left and right chassis members have different folding directions so that the three chassis members form an S-shape; a larger chassis member and a smaller chassis member foldably coupled to either one of left and right edge portions of the larger chassis member to form a J-shape, for example. Four or more chassis members may be coupled to each other. In a case where three or more chassis members are coupled to each other, a display may be provided across at least two chassis members and a bezel member may cover an outer peripheral edge portion of such display. Another display may be provided on the remaining chassis member(s).

The invention claimed is:

1. A foldable portable information device, comprising:
a first chassis member;
a second chassis member, an edge portion of which being adjacent to an edge portion of the first chassis member;
a hinge mechanism rotatably coupling the edge portion of the first chassis member and the edge portion of the second chassis member;
a display provided across an inner surface of the first chassis member and an inner surface of the second chassis member, the display being foldable so that a portion of a display surface overlapping the first chassis member and a portion of the display surface overlapping the second chassis member face each other; and
a bezel member provided to bridge an outer peripheral edge portion of the display and an outer peripheral edge portion of the first chassis member and the second chassis member except at the edge portions, the bezel member being arranged farther away from the inner surface of the first chassis member and the inner surface of the second chassis member than a rotation center of the hinge mechanism,
wherein the bezel member has a buffer portion at least at a position overlapping a bent portion of the display, the buffer portion being able to absorb compressive force applied thereto as the first chassis member and the second chassis member are folded from a flat opened state;

wherein the buffer portion has a plurality of hole portions that are open to a top surface of the bezel member;

wherein the bezel member includes a base material and a sheet member provided between a back side of the base material and a front side of the display, the hole portions being formed to penetrate the base material in a thickness direction, and bottoms of the hole portions being closed with the sheet member.

2. The portable information device according to claim 1, wherein a part of the plurality of hole portions are open to a side end surface of the bezel member.

3. The portable information device according to claim 1, wherein an entire length of the bezel member is fixed to a front side of the display.

4. A foldable portable information device, comprising:
a first chassis member;
a second chassis member, an edge portion of which being adjacent to an edge portion of the first chassis member;
a hinge mechanism rotatably coupling the edge portion of the first chassis member and the edge portion of the second chassis member;
a display provided across an inner surface of the first chassis member and an inner surface of the second chassis member, the display being foldable so that a portion of a display surface overlapping the first chassis member and a portion of the display surface overlapping the second chassis member face each other; and
a bezel member provided to bridge an outer peripheral edge portion of the display and an outer peripheral edge portion of the first chassis member and the second chassis member except at the edge portions, the bezel member being arranged farther away from the inner surface of the first chassis member and the inner surface of the second chassis member than a rotation center of the hinge mechanism, wherein the bezel member has a buffer portion at a position overlapping a bent portion of the display, the buffer portion being formed to be more flexible than other portions of the bezel member;

wherein the buffer portion has a plurality of hole portions that are open to a top surface of the bezel member;

wherein the bezel member includes a base material and a sheet member provided between a back side of the base material and a front side of the display, the hole portions being formed to penetrate the base material in a thickness direction, and bottoms of the hole portions being closed with the sheet member.

5. The portable information device according to claim 4, wherein a part of the plurality of hole portions are open to a side end surface of the bezel member.

6. The portable information device according to claim 4, wherein an entire length of the bezel member is fixed to a front side of the display.

* * * * *